Nov. 1, 1932.   O. C. TRAVER   1,885,157
CONTROL OF ELECTRIC SWITCHES
Filed Aug. 3, 1931

Inventor:
Oliver C. Traver,
by Charles E. Tullar.
His Attorney.

Patented Nov. 1, 1932

1,885,157

UNITED STATES PATENT OFFICE

OLIVER C. TRAVER, OF DREXEL HILL, PENNSYLVANIA, ASSIGNOR TO GENERAL ELECTRIC COMPANY, A CORPORATION OF NEW YORK

CONTROL OF ELECTRIC SWITCHES

Application filed August 3, 1931. Serial No. 554,662.

My invention relates to improvements in the control of electric switches and more particularly circuit breakers which are opened automatically on the occurrence of abnormal circuit conditions and which are arranged to be closed by suitable control switching means to effect the energization of electromagnetic operating means for closing the circuit breakers.

If the control switching means is maintained in the circuit closing position after the circuit breaker closes and the circuit breaker immediately opens, due to an abnormal condition on the circuit it controls, or failure of the latching mechanism, the circuit breaker operating means is again energized as soon as the circuit breaker is open and consequently the circuit breaker is reclosed. Under such conditions, the circuit breaker may continue to open and close indefinitely. This so-called pumping action, if permitted, is practically certain to result in serious damage to the circuit breaker and other apparatus associated with the circuit it controls.

An object of my invention is to provide an improved arrangement for preventing the repeated opening and closing of a circuit breaker under conditions such as those mentioned.

In accordance with my invention, the circuit breaker electromagnetic operating means is rendered temporarily inoperative to reclose the circuit breaker after one closing operation by means responsive to the inductive discharge of the operating means upon the deenergization thereof.

My invention will be better understood from the following description when considered in connection with the accompanying drawing and its scope will be pointed out in the appended claims.

Figure 1:
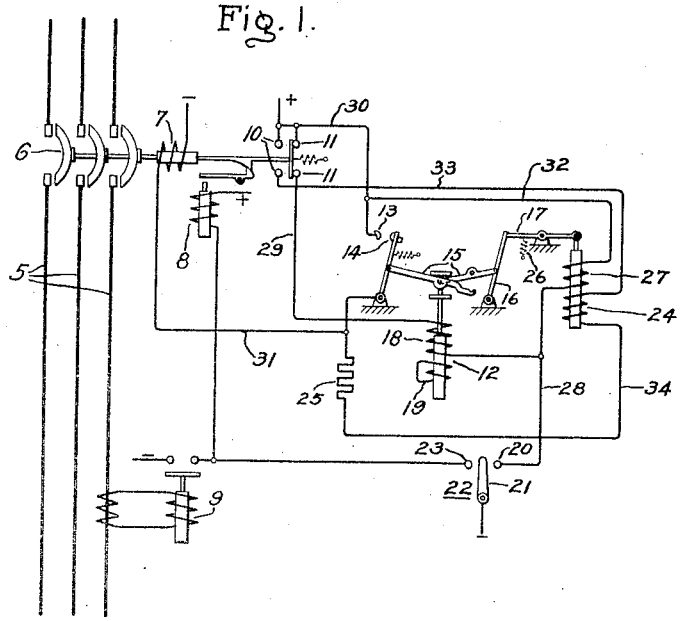
Figure 2:
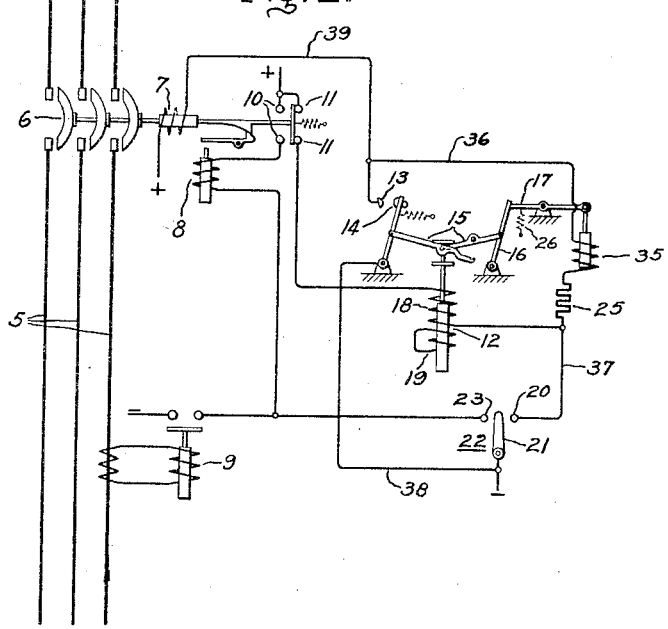

In the accompanying drawing, Fig. 1 illustrates diagrammatically a circuit breaker control arrangement embodying my invention and Fig. 2 illustrates diagrammatically a modification of my invention.

Referring now to Fig. 1, the electric circuit 5, shown as a three-phase circuit for example, is arranged to be controlled by a circuit breaker 6. This is shown as of the latched closed type since my invention is particularly adapted to the control of such circuit breakers. For operating the circuit breaker 6 to one circuit controlling position, that is the circuit closing position, it is provided with any suitable electromagnetic operating means indicated as a closing solenoid 7. For effecting the operation of the circuit breaker to another circuit controlling position, that is the circuit opening position, it is provided with any suitable means such as a trip coil 8. This may be arranged to be energized on the occurrence of abnormal circuit conditions by any suitable means responsive to these conditions, such for example as an overcurrent relay 9. The circuit breaker 6 may also be provided with auxiliary switch contacts 10 which are arranged to be closed when the circuit breaker is closed and open when the circuit breaker is open and contacts 11 which are arranged to be closed when the circuit breaker is open and vice versa.

For controlling the closing solenoid 7, there is provided a control relay 12 shown as of the hesitating trip-free type. This relay includes cooperating contacts 13 and 14 in the circuit of the solenoid 7, a toggle mechanism 15, a movable abutment 16 for the toggle mechanism and a latch 17 for restraining the abutment 16. For operating the movable contact 14, the relay is provided with an operating winding 18. In order to retard the decay of flux in the magnetic structure of the operating winding 18 when the circuit thereof is broken so as to delay the opening of the contacts 13 and 14 and thereby provide time enough for the latching of the circuit breaker, a short-circuited winding 19 is provided.

For controlling the relay 12, its operating winding 18 may be connected in series with the contacts 20, 21 of a control switch 22 and the circuit breaker auxiliary switch contacts 11. The control switch 22 may be of the stay-put type, if desired, that is the movable contact 21 remains in any position to which it is moved. The control switch 22 may be double-throw with a contact 23 in the circuit of the trip coil 8 so as to provide a manual control for tripping the circuit breaker.

According to my invention, I provide means connected to be energized in accordance with the inductive discharge of the electromagnetic closing means 7 upon the opening of the circuit thereof for preventing the closing means from operating the circuit breaker 6 to the closed position a second time upon opening thereof while the control switch 21 remains in a given position. As illustrated in Fig. 1, this means includes a winding 24 connected across the contacts 13, 14 of the control relay 12 and arranged to render this relay inoperative to close its contacts 13 and 14 by tripping the latch 17. The winding 24 is connected across the contacts 13 and 14 of the control relay through a circuit which includes the auxiliary switch contacts 10, conductor 33, winding 24, conductor 34 and current limiting means 25. The current limiting means 25 may be a resistance of such a value as to prevent enough current flow to maintain the closing means 7 energized sufficiently to hold the circuit breaker closed. If the latch 17 of the control relay is automatically reset by any suitable means, such as the spring 26, then I provide suitable means for preventing the resetting of the latch while the control switch 22 is closed on contact 20. As shown, this means includes the winding 27 in circuit with the contacts 20, 21 of the control switch 22 incapable, when energized, of actuating the latch 17 to the tripping position, but able, when this latch is tripped by the winding 24, to restrain the latch in the tripped position.

Assuming now that the circuit breaker 6 is open and that the parts are positioned as shown in Fig. 1, then upon closing the control switch 22 on contact 20, the circuit of the control relay operating winding 18 is completed as follows: From minus, through the control switch contacts 20, 21, conductor 28, operating winding 18, conductor 29 and auxiliary switch contacts 11, to plus. The energization of the operating winding 18 effects the closing of the contacts 13 and 14 whereby to complete the circuit of the closing solenoid 7 from plus, through conductor 30, contacts 13 and 14, conductor 31 and closing solenoid 7 to minus. The closing operation of the circuit breaker opens the circuit of the operating winding 18 at the contacts 11 before the crcuit breaker is latched but the hesitating feature of the relay 12 maintains the contacts 13 and 14 closed long enough to permit the latching of the circuit breaker. Upon the closing of the circuit breaker, the tripping winding 24 of the control relay 12 is connected across the contacts 13, 14 of this relay through the auxiliary switch contacts 10 and the resistance 25. The restraining winding 27 is energized, upon closure of the control switch 22 on contact 20, through a circuit from plus and including conductors 30 and 32, winding 27, conductor 28 and contacts 20, 21, to minus. Consequently, upon the opening of the contacts 13 and 14 of the control relay, the inductive discharge of the closing means 7 will energize the tripping winding 24 whereby to trip the latch 17 and, if the movable contact 21 of the control switch 22 has been left or is held on the contact 20, then the restraining winding 27 will maintain the latch 17 in the tripped position. If the control switch contacts 20 and 21 are not in engagement, the latch 17 will be reset by the spring 26 because, upon the dissipation of the inductive discharge, there will be no pull by the winding 24 tending to hold the latch 17 in the tripped position.

If the circuit breaker 6 is closed on a faulty circuit, the protective relay means 9 quickly operates to effect the opening of the circuit breaker or if the latching mechanism fails to operate properly, the circuit breaker will not stay closed. If the control switch contact 21 is in engagement with contact 20, then the restraining winding 27 will be energized to maintain the latch 17 in the tripped position following its tripping by the energization of the winding 24. Consequently, before the circuit breaker 6 can be closed a second time, the control switch 22 must be operated to separate its contacts 20 and 21 and thereby deenergize the winding 27 so as to permit the return of the latch 17 to the latching position.

In the embodiment of my invention shown in Fig. 2, the control relay restraining and tripping windings 27 and 24 are combined in a single winding 35 which is connected across the contacts 13 and 14 in a circuit including conductor 36, winding 35, resistance 25, conductor 37, control switch contacts 20, 21 and the conductor 38. In this way the winding 35 is energized in accordance with the inductive discharge of the closing coil 7 when the control relay 12 opens its contacts 13 and 14. The winding 35 is connected in a circuit from plus through the closing coil 7, conductor 39, conductor 36, winding 35, resistance 25, conductor 37, contacts 20 and 21 of the control switch, to minus. Consequently, whenever the control switch is closed on contact 20, the winding 35 is energized to a degree sufficient to maintain the latch 17 in the tripped position if it has already been tripped but not sufficient to trip the latch. Inasmuch as this circuit includes the resistance of the closing coil, the resistance 25 in this embodiment of my invention can be made much smaller than in the arrangement shown in Fig. 1. Apart from incorporating the functions of the two coils 24 and 27 of Fig. 1 in a single coil 35 as shown in Fig. 2, the operation of the modification of my invention shown in Fig. 2 is substantially the same and will be obvious in view of the description of Fig. 1.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an electric circuit, a circuit breaker for controlling said circuit, electromagnetic means for closing said circuit breaker, means for opening said circuit breaker, means for effecting the energization of said closing means including a switch, means for effecting the opening of the circuit of said closing means upon the closing of the circuit breaker and means connected to be energized in accordance with the inductive discharge of said closing means upon the opening of the circuit thereof for preventing a reclosure of the circuit breaker upon the opening thereof while said switch is closed.

2. In combination, a circuit breaker, electromagnetic means for closing said circuit breaker, means for effecting the energization of said electromagnetic means including a control relay, means for effecting the opening of the circuit of said electromagnet means, and means for rendering said relay inoperative to effect the energization of said closing means connected to be energized in accordance with the inductive discharge of the closing means upon the opening of the circuit thereof.

3. In combination, a circuit breaker, electromagnetic means for closing said circuit breaker, means for effecting the energization of said electromagnetic means including a trip-free relay means for effecting the opening of the circuit of said electromagnetic means and means for tripping said relay connected to be energized in accordance with the inductive discharge of the closing means upon the opening of the circuit thereof.

4. In combination, a circuit breaker, electromagnetic means for closing said circuit breaker, means including a switch for effecting the energization of said closing means, means for effecting the opening of the circuit of said closing means upon the closing of the circuit breaker and means connected to be energized in accordance with the inductive discharge of said closing means upon the opening of the circuit thereof for preventing a reclosure of the circuit breaker upon the opening thereof while said switch is closed.

5. In combination, a circuit breaker, electromagnetic means for operating said circuit breaker to one circuit controlling position, means including a switch for effecting the energization of said electromagnetic means, means for effecting the opening of the circuit of said electromagnetic means upon the movement of the circuit breaker to another circuit controlling position and means connected to be energized in accordance with the inductive discharge of said electromagnetic means upon the opening of the circuit thereof for preventing said electromagnetic means from operating the circuit breaker to said one circuit controlling position a second time upon operation of the circuit breaker to said other circuit controlling position while the control switch remains in a given position.

6. In combination, a circuit breaker, electromagnetic means for closing said circuit breaker, means for effecting the energization of said electromagnetic means including a control relay, means for effecting the opening of the circuit of said electromagnetic means, a switch for controlling said relay and means for rendering said relay inoperative to control said closing means upon opening of the circuit breaker while the switch is closed connected to be energized in accordance with the inductive discharge of the closing means upon the opening of the circuit thereof.

7. In combination, a circuit breaker, electromagnetic means for operating said circuit breaker to one circuit controlling position, means including a switch movable to a given position to effect the energization of said electromagnetic means, means for opening the circuit of said electromagnetic means upon movement of the circuit breaker to another circuit controlling position and means connected to be energized in accordance with the inductive discharge of said electromagnetic means upon the opening of the circuit thereof for preventing said electromagnetic means from operating the circuit breaker to said one circuit controlling position a second time upon operation of the circuit breaker to said other circuit controlling position while the control switch remains in the given position.

8. In combination, a circuit breaker, electromagnetic means for closing said circuit breaker, means for controlling the energization of said electromagnetic means including a relay having contacts in the energizing circuit of said electromagnetic means, means including a switch movable to a given position to effect the energization of said relay whereby to close its contacts, means operative upon closure of the circuit breaker to effect the deenergization of said relay whereby to open its contacts and means connected to be energized in accordance with the inductive discharge of said electromagnetic means upon the opening of the contacts of said relay for preventing said electromagnetic means from closing the circuit breaker a second time upon opening of the circuit breaker while the control switch remains in the given position.

In witness whereof, I have hereunto set my hand this 31st day of July, 1931.

OLIVER C. TRAVER.